United States Patent
Kang et al.

(10) Patent No.: US 9,775,060 B2
(45) Date of Patent: Sep. 26, 2017

(54) METHOD AND APPARATUS FOR CHANNEL INFORMATION FEEDBACK IN WIRELESS COMMUNICATION SYSTEM

(71) Applicant: LG ELECTRONICS INC., Seoul (KR)

(72) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 14/351,440

(22) PCT Filed: Oct. 12, 2012

(86) PCT No.: PCT/KR2012/008348
§ 371 (c)(1),
(2) Date: Apr. 11, 2014

(87) PCT Pub. No.: WO2013/055166
PCT Pub. Date: Apr. 18, 2013

(65) Prior Publication Data
US 2014/0247748 A1    Sep. 4, 2014

Related U.S. Application Data

(60) Provisional application No. 61/547,041, filed on Oct. 14, 2011.

(51) Int. Cl.
*H04L 12/16* (2006.01)
*H04W 24/08* (2009.01)
(Continued)

(52) U.S. Cl.
CPC .......... *H04W 24/08* (2013.01); *H04B 7/063* (2013.01); *H04B 7/0626* (2013.01);
(Continued)

(58) Field of Classification Search
CPC .................................................... H04W 24/08
(Continued)

(56) References Cited

U.S. PATENT DOCUMENTS 7,577,206 B2  8/2009  Kim
7,881,721 B2  2/2011  McCoy et al.
(Continued)

FOREIGN PATENT DOCUMENTS

WO  WO 2009/118707 A1  10/2009
WO  WO 2010/048142 A1  4/2010

*Primary Examiner* — Awet Haile
*Assistant Examiner* — Abdeltif Ajid
(74) *Attorney, Agent, or Firm* — Birch, Stewart, Kolasch & Birch, LLP

(57) ABSTRACT

Provided are a method and apparatus for a UE (user equipment) to provide reference signal feedback in a wireless communication system. The method includes: receiving, from a base station, CSI-RS configuration information for configuring CSI-RS (channel state information reference signal) patterns, the CSI-RS configuration information containing usage information; performing a first measurement for radio resource management on all CSI-RS patterns configured based on the CSI-RS configuration information; and performing a second measurement only on CSI-RS patterns corresponding to the usage information, the second measurement being determined by the usage indicated by the usage information.

10 Claims, 6 Drawing Sheets

(51) Int. Cl.
  *H04J 11/00*   (2006.01)
  *H04L 5/00*    (2006.01)
  *H04B 7/06*    (2006.01)
  *H04L 25/02*   (2006.01)
(52) U.S. Cl.
  CPC ........ *H04B 7/0639* (2013.01); *H04J 11/0023* (2013.01); *H04L 5/0023* (2013.01); *H04L 5/0057* (2013.01); *H04L 25/0226* (2013.01)
(58) Field of Classification Search
  USPC .......................................................... 370/252
  See application file for complete search history.

(56) References Cited

U.S. PATENT DOCUMENTS

| | | | |
|---|---|---|---|
| 2011/0217972 A1* | 9/2011 | Vukajlovic Kenehan ................ | H04B 17/24 455/423 |
| 2012/0213261 A1* | 8/2012 | Sayana ................ | H04L 5/0094 375/224 |
| 2012/0257515 A1* | 10/2012 | Hugl ................... | H04W 24/10 370/252 |

* cited by examiner

[Fig. 1]
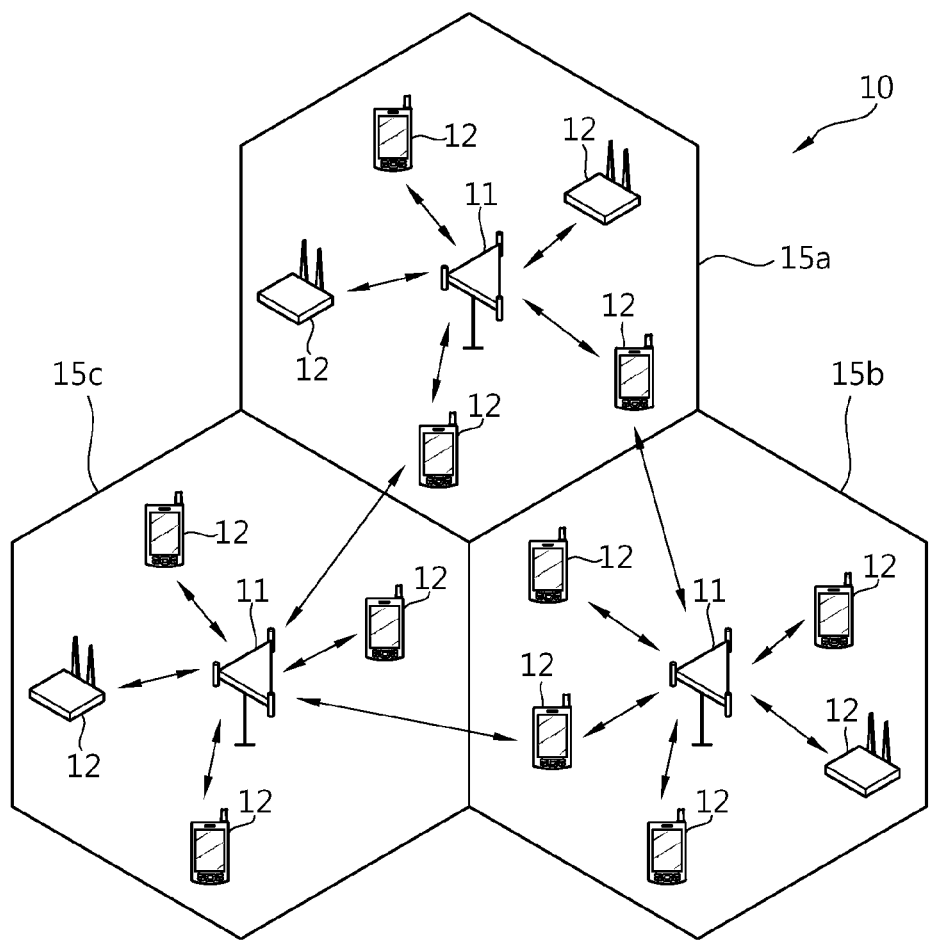
[Fig. 2]
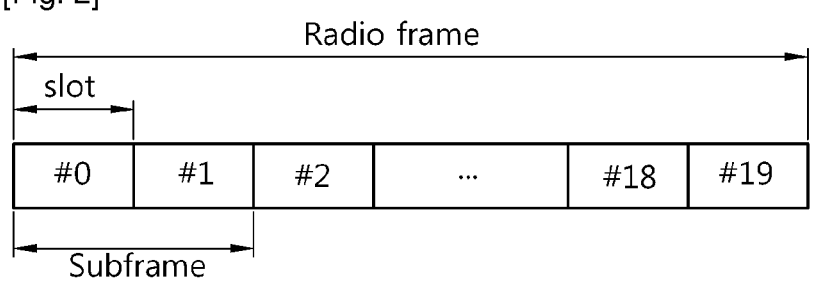

[Fig. 3]
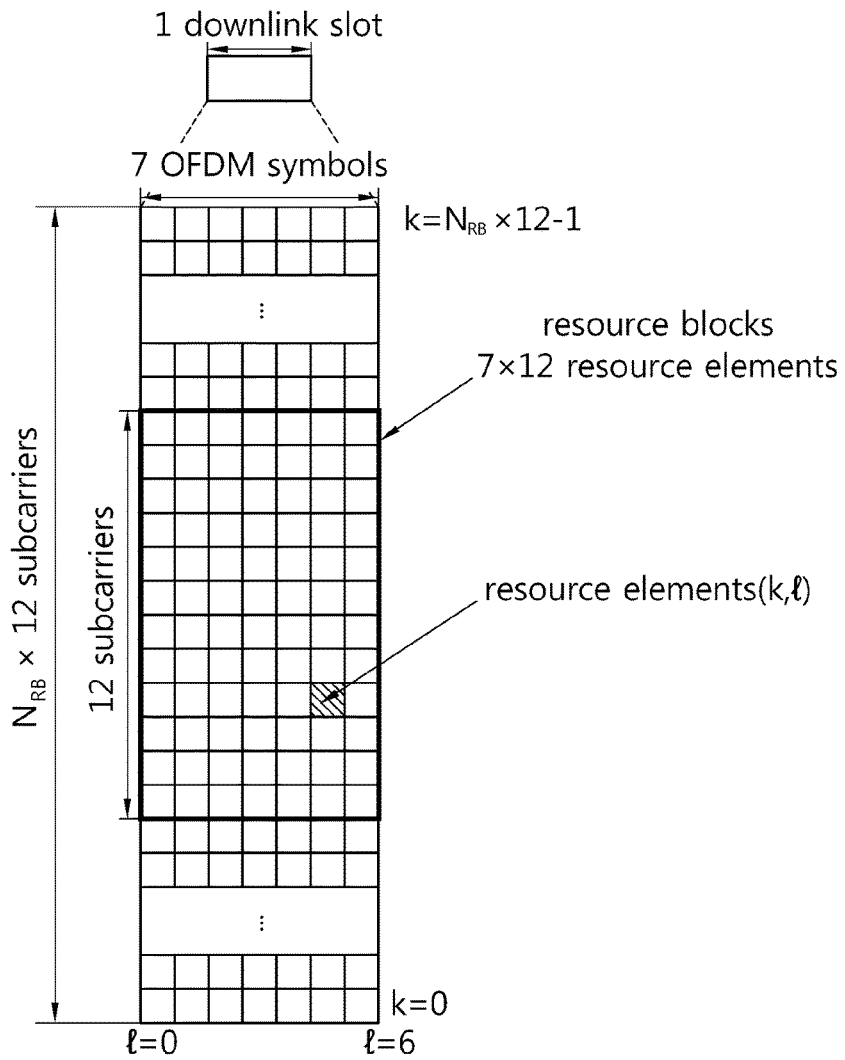
[Fig. 4]
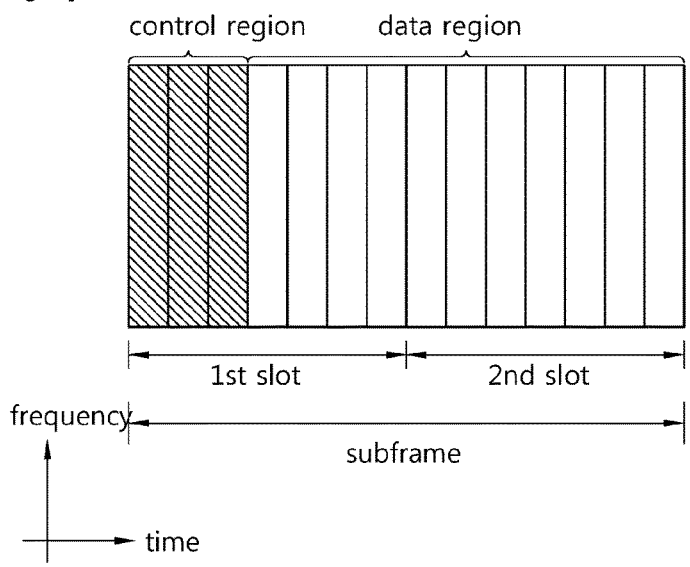

[Fig. 5]
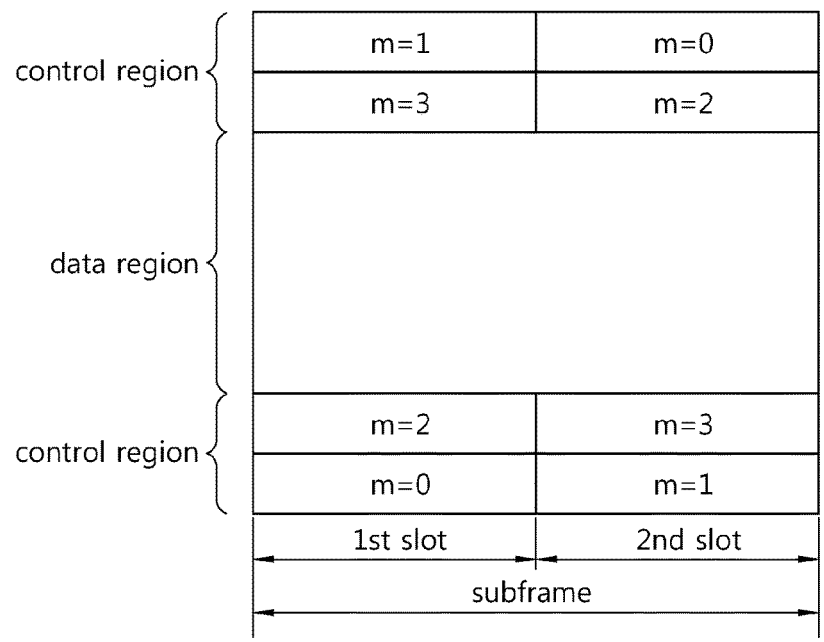
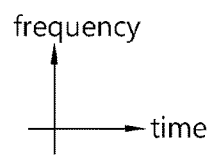
[Fig. 6]
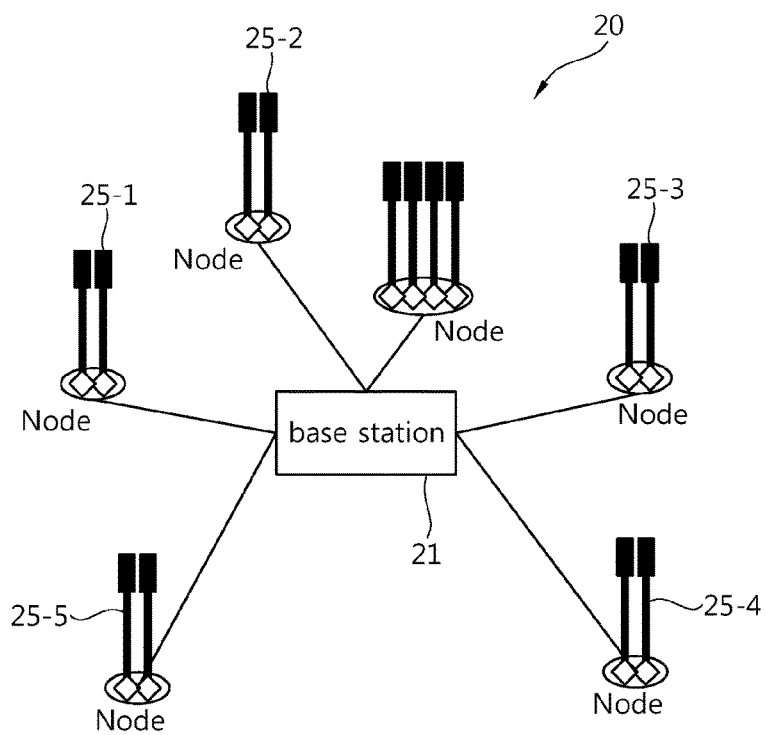

[Fig. 7]
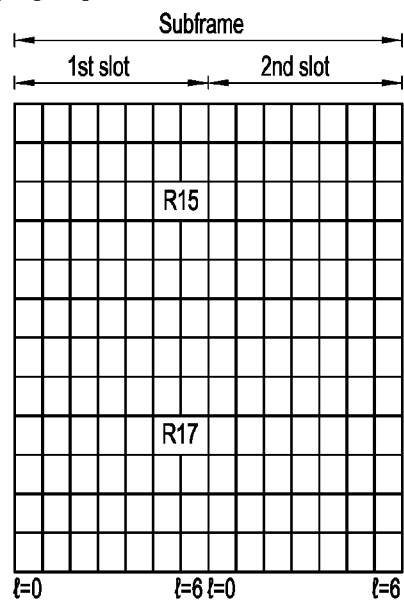
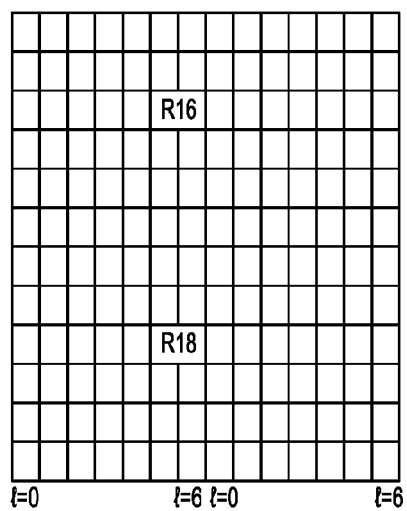
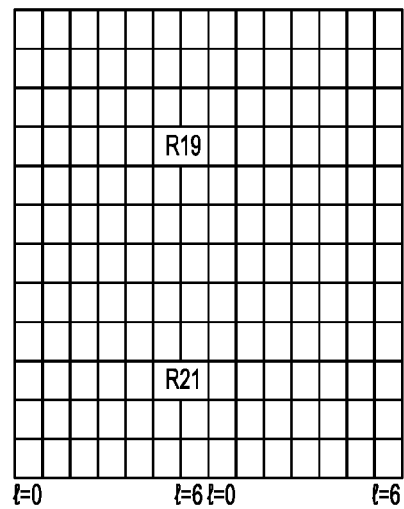
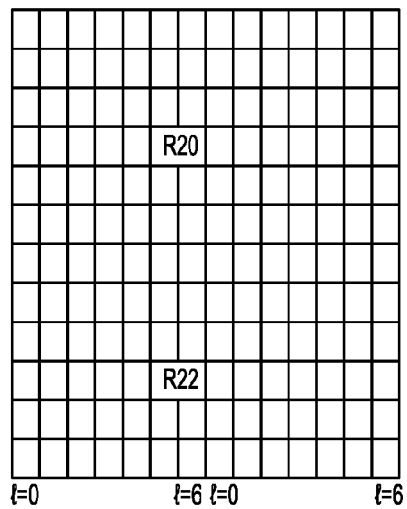

[Fig. 8]
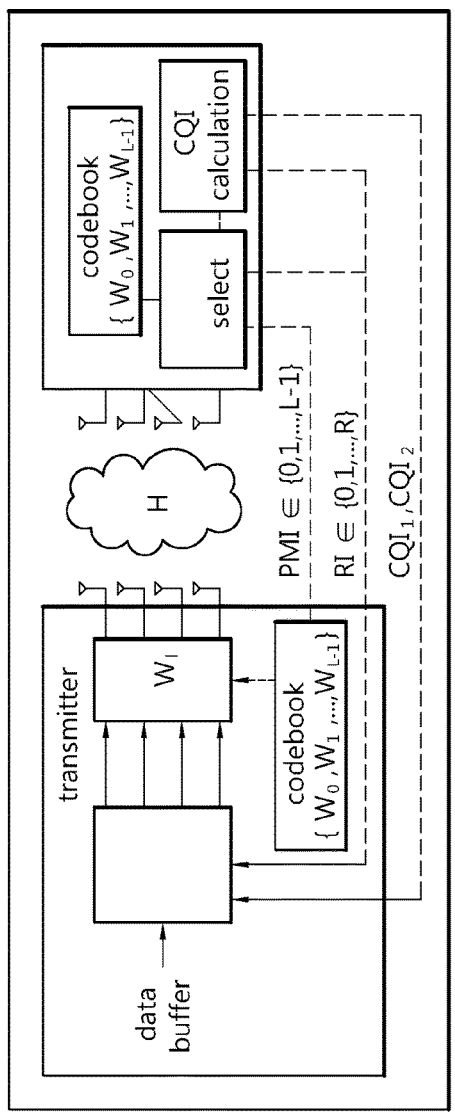
[Fig. 9]
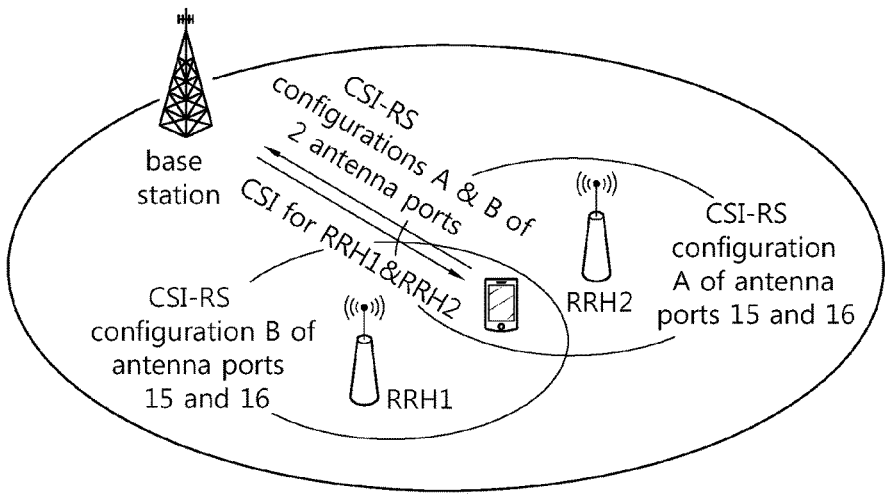

[Fig. 10]
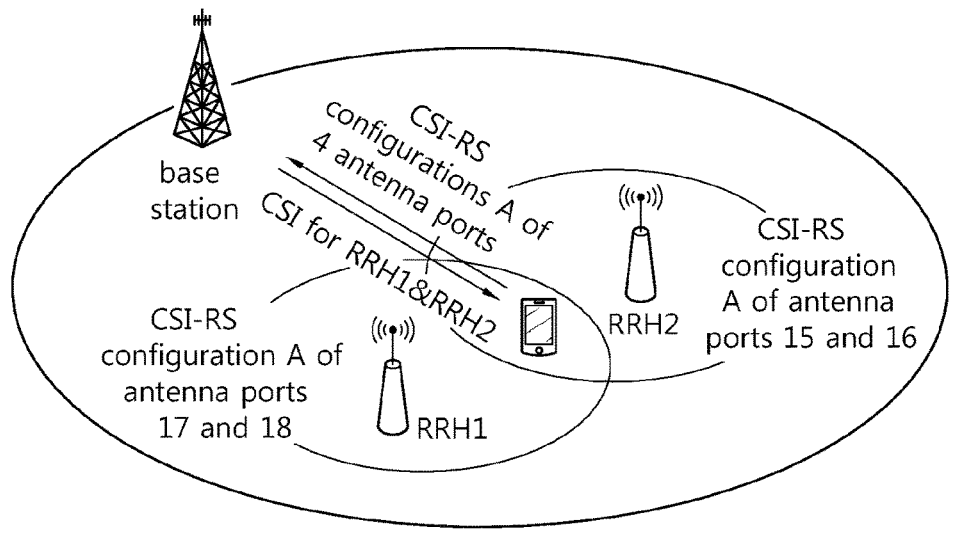
[Fig. 11]
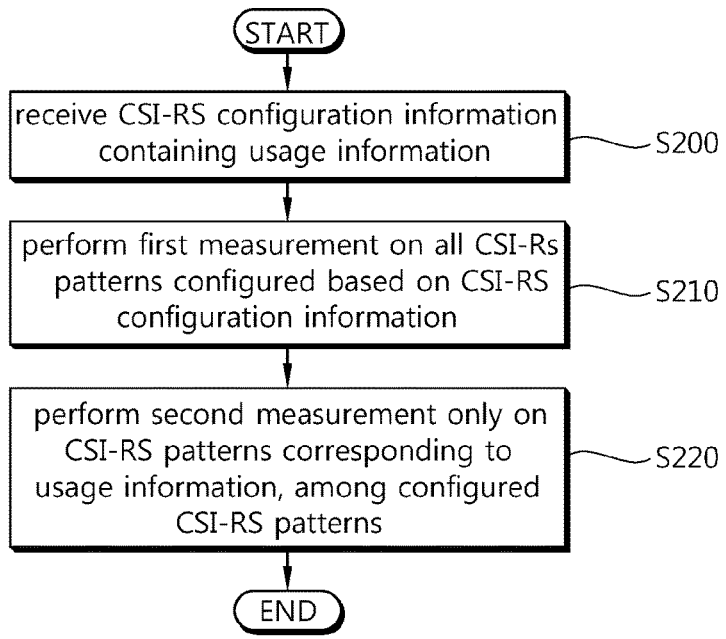
[Fig. 12]
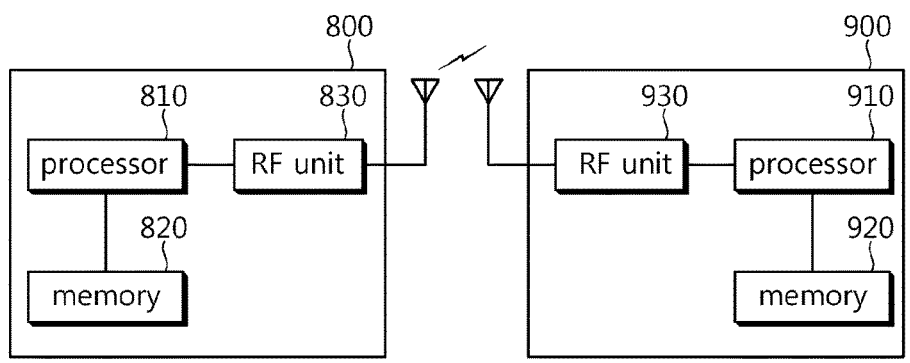

METHOD AND APPARATUS FOR CHANNEL INFORMATION FEEDBACK IN WIRELESS COMMUNICATION SYSTEM

CROSS REFERENCE TO RELATED APPLICATIONS

This application is the National Phase of PCT/KR2012/008348 filed on Oct. 12, 2012, which claims priority under 35 U.S.C. 119(e) to U.S. Provisional Application No. 61/547,041 filed on Oct. 14, 2011, all of which are hereby expressly incorporated by reference into the present application.

TECHNICAL FIELD

The present invention relates to wireless communications, and more particularly, to a method and apparatus for channel information feedback in a wireless communication system.

BACKGROUND ART

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and propagated. To satisfy the required high data transfer amount, a carrier aggregation technique, a recognition radio technique, or the like for effectively using more frequency bands, and a multiple antenna technique, a multiple base station cooperation technique, or the like for increasing data capacity within a limited frequency have recently drawn attention.

In addition, the wireless network has been evolved in a direction of increasing density of a node capable of accessing to an area around a user. Herein, the node implies an antenna (or antenna group), in a distributed antenna system (DAS), separated from other antenna by a certain distance or farther. However, the node is not limited to this definition, and thus can also be used in a broader sense. That is, the node may be a pico-cell eNB (PeNB), a home eNB (HeNB), a remote radio head (RRH), a remote radio unit (RRU), a relay, etc. A wireless communication system having such a node with higher density can provide higher system performance by cooperation between nodes. That is, better system performance can be achieved when one base station controller manages transmission and reception of respective nodes and thus the nodes operate as if they are antennas or an antenna group for one cell, in comparison with a case where the respective nodes operate as an independent base station (BS), advanced BS (ABS), node-b (NB), eNode-B (eNB), access point (AP), etc., and thus do not cooperate with each other. Hereinafter, a wireless communication system including multiple nodes is referred to as a multi-node system.

A node is applicable even if it is defined as an antenna group, irrespective of distance, as well as an antenna group spaced a distance apart from another antenna group. For example, a base station including cross-polarized antennas can be regarded as including a node consisting of an H-pol antenna and a node consisting of a V-pol antenna.

Coordinated multipoint transmission and reception (CoMP) is applicable to a multi-node system. Inter-cell interference can be reduced by applying CoMP to a multi-cell multi-node system, and intra-cell inter-point interference can be reduced by applying CoMP to a single-cell multi-node system.

There are two types of CoMP schemes: a JP (joint processing) scheme and a CS (coordinated scheduling/beamforming) scheme. In the JP scheme, multiple nodes share and transmit data of UE. In the CS scheme, a single node transmits data of a UE cooperates with other nodes by scheduling or by forming transmission beams to reduce interference.

In the multi-node system, a method for a UE to efficiently measure channel information is required.

In the multi-node system, a base station may request the UE to provide channel information feedback to the nodes in the vicinity of the UE. The channel information required by the base station may vary according to purpose/usage.

In the multi-node system, what channel information feedback the UE will provide after measuring a reference signal may be an issue.

SUMMARY OF INVENTION

Technical Problem

The present invention has been made in an effort to provide a method and apparatus for measuring channel information and providing channel information feedback in a wireless communication system.

Solution to Problem

According to an aspect of the present invention, a method for a UE (user equipment) to provide reference signal feedback in a wireless communication system, is provided. The method comprising: receiving, from a base station, CSI-RS configuration information for configuring a CSI-RS (channel state information reference signal) pattern, the CSI-RS configuration information containing usage information; performing a first measurement for radio resource management on all CSI-RS patterns configured based on the CSI-RS configuration information; and performing a second measurement only on CSI-RS patterns corresponding to the usage information, the second measurement being determined by the usage indicated by the usage information.

According to another aspect of the present invention, a UE (user equipment) for measuring channel information and providing channel information feedback in a wireless communication system, is provided. The UE comprising: an RF (radio frequency) unit for transmitting or receiving a radio signal; and a processor connected to the RF unit, wherein the processor receives, from a base station, CSI-RS configuration information for configuring a CSI-RS (channel state information reference signal) pattern, the CSI-RS configuration information containing usage information, performs a first measurement for radio resource management on all CSI-RS patterns configured based on the CSI-RS configuration information, and performs a second measurement only on CSI-RS patterns corresponding to the usage information, the second measurement being determined by the usage indicated by the usage information.

Advantageous Effects of Invention

In a multi-node system, a UE can generate channel information for appropriate purpose/usage and provide feedback. Accordingly, system efficiency is increased.

BRIEF DESCRIPTION OF DRAWINGS

FIG. 1 shows a wireless communication system;

FIG. 2 shows the structure of a radio frame in 3GPP LTE;

FIG. 3 shows an example of a resource grid of one downlink slot;

FIG. 4 shows the structure of a downlink subframe;

FIG. 5 shows the structure of an uplink subframe;

FIG. 6 shows an example of a multi-node system;

FIG. 7 shows an example of an RB to which a CSI-RS is mapped;

FIG. 8 shows the concept of CSI feedback;

FIG. 9 shows an example in which multiple CSI-RS patterns are configured;

FIG. 10 shows an example in which a single CSI-RS pattern is configured for multiple nodes;

FIG. 11 shows a method for a UE to provide reference signal feedback according to an embodiment of the present invention; and FIG. 12 is a block diagram of a wireless communication system according to an embodiment of the present invention.

MODE FOR THE INVENTION

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LET-A will be largely described, but the technical concept of the present invention is not meant to be limited thereto.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device, etc. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technology can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows the structure of a radio frame in 3GPP LTE.

For the radio frame structure, reference can be made to Paragraph 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)"

Referring to FIG. 2, the radio frame includes ten subframes, and one subframe includes two slots. The slots within the radio frame are allocated slot numbers from #0 to #19. The time that it takes to transmit one subframe is called a Transmission Time Interval (TTI). The TTI can be called a scheduling unit for data transmission. For example, the length of one radio frame can be 10 ms, the length of one subframe can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of subframes included in a radio frame, the number of slots included in a subframe, or the number of OFDM symbols included in a slot can be changed in various ways.

In the 3GPP LTE specifications, one slot is defined to include seven OFDM symbols in a normal cyclic Prefix (CP), and one slot is defined to include six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

FIG. 3 shows an example of a resource grid of one downlink slot.

The downlink slot includes a plurality of OFDM symbols in a time domain and $N_{RB}$ resource blocks in a frequency domain. The number $N_{RB}$ of resource blocks included in the downlink slot depends upon a downlink transmission bandwidth set in a cell. For example, in an LTE system, $N_{RB}$ may be any one value in the range of 6 to 110. One resource block includes a plurality of subcarriers in the frequency domain. An uplink slot may have the same structure as the downlink slot.

Each element on the resource grid is called a resource element. The resource elements on the resource grid can be identified by an index pair (k, l) within the slot. Here, $k(k=0, \ldots, N_{RB} \times 12-1)$ denotes a subcarrier index in the frequency domain, and $l(l=0, \ldots, 6)$ denotes an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows the structure of a downlink subframe.

The downlink subframe includes two slots in a time domain. Each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region to which control channels are allocated. The remaining OFDM symbols correspond to a data region to which a physical downlink shared channel (PDSCH) is allocated.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. When configured by a higher layer, the UE can simultaneously transmit the PUCCH and the PUSCH.

The PUCCH with respect to a UE is allocated by a pair of resource blocks in a subframe. The resource blocks belonging to the pair of resource blocks occupy different subcarriers in first and second slots, respectively. The frequency occupied by the resource blocks belonging to the pair of resource blocks is changed based on a slot boundary. This is said that the pair of RBs allocated to the PUCCH are frequency-hopped at the slot boundary. The UE can obtain a frequency diversity gain by transmitting uplink control information through different subcarriers according to time. In the figure, m is a position index indicating the logical frequency domain positions of the pair of resource blocks allocated to the PUCCH in the subframe.

Uplink control information transmitted on the PUCCH may include a HARQ ACK/NACK, a channel quality indicator (CQI) indicating the state of a downlink channel, a scheduling request (SR), which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve the performance of a wireless communication system, technology is evolving into an increase in the density of nodes capable of accessing user peripheries. A wireless communication system including a high density of nodes may have better system performance through cooperation between the nodes. Hereinafter, a wireless communication system including multiple nodes is referred to as a multi-node system. In the multi-node system, a base station is capable of controlling multiple nodes.

FIG. 6 shows an example of a multi-node system.

Referring to FIG. 6, the multi-node system includes a base station 21 and a plurality of nodes 25-1, 25-2, 25-3, 25-4, and 25-5. The plurality of nodes 25-1, 25-2, 25-3, 25-4, and 25-5 can be controlled by one base station 21. That is, the plurality of nodes 25-1, 25-2, 25-3, 25-4, and 25-5 operate as if they are a part of one cell.

Separate node identifiers (IDs) may be given to the individual nodes, or the individual nodes may operate as if they are some antenna groups within a cell without the separate node IDs. In this case, the multi-node system 20 of FIG. 6 may be regarded as a distributed multi-node system (DMNS) forming a cell.

Alternatively, the individual nodes may have separate cell IDs and perform scheduling and handover (HO) of the UE. In this case, the multi-node system 20 of FIG. 6 can be regarded as a multi-cell system. The base station 21 may be a macrocell, and each node may be a femtocell or picocell having smaller coverage than the macrocell has. If the multiple cells are configured such that they are overlaid according to coverage, they may be regarded as a multi-tier network.

Each of the nodes 25-1, 25-2, 25-3, 25-4, and 25-5 of FIG. 6 may be any one of a base station, a node B, an eNOde-B, a picocell eNB (PeNB), a home eNB (HeNB), a radio remote head (RRH), a relay station (RS; or a repeater), and a distributed antenna. At least one antenna may be installed at one node. A node may also be called a point. In the specification described below, a node denotes an antenna group spaced a predeterminane distance apart from another antenna group in the DMNS. That is, in the specification described below, it is assumed that each node physically indicates an RRH. However, the present invention is not limited thereto, and a node may be defined as an antenna group, regardless of physical distance. For example, the present invention may be applied, provided that a base station including multiple cross polarized antennas includes a node consisting of horizontal polarized antennas and a node consisting of vertical polarized antennas. Moreover, if each node is a picocell or femtocell whose coverage is smaller than the coverage of the macrocell, the present invention may be applied to a multi-cell system. In the following description, an antenna may be replaced by an antenna port, a virtual antenna, an antenna group, or the like.

A reference signal is described below.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A downlink reference signal may include a cell-specific reference signal (CRS), a multimedia broadcast and multicast single frequency network (MBSFN) reference signal, a UE-specific reference signal, a positioning reference signal (PRS), a channel state information reference signal (CSI-RS), and the like. The CRS is a reference signal that is transmitted to all UEs within a cell. The CRS may be used to perform channel measurement for channel quality indicator (CQI) feedback and channel estimation for a PDSCH. The MBSFN reference signal may be transmitted in a subframe allocated for MBSFN transmission. The UE-specific reference signal is a reference signal received by a specific UE (or a specific UE group) in a cell, and is mainly used by the specific UE or the specific UE group to perform data demodulation. The PRS may be used to estimate the position of the UE.

The CSI-RS is used to perform channel estimation for a PDSCH for an LTE-A UE and channel measurement for channel information generation. The CSI-RS is relatively sparse in a frequency domain or a time domain. The CSI-RS may be punctured in a data region of a normal subframe or an MBSFN subframe. If necessary for estimation of the CSI, CQI, PMI, RI, or the like may be reported from the UE.

The CSI-RS is transmitted on 1, 2, 4, or 8 antenna ports. The antenna ports used are p=15, p=15,16, p=15, . . . , 18 and p=15, . . . , 22, respectively. The CSI-RS is defined for a subcarrier interval of $\Delta f=15$ kHz only. For the CSI-RS, reference can be made to Paragraph 6.10.5 of 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)".

For CSI-RS transmission, 32 different configurations may be proposed in order to decrease inter-cell interference (ICI) in a multi-cell environment including a heterogeneous network environment. The configuration for the CSI-RS differs depending on the number of antenna ports in a cell, and neighboring cells may have as much different CSI-RS configurations as possible. Moreover, the CSI-RS configurations may be divided into ones applied to both an FDD frame and a TDD frame and ones applied only to a TDD frame according to a frame structure. A plurality of CSI-RS configurations can be used in a given cell.

Zero or one configuration in which the UE assumes non-zero power for the CSI-RS may be used, and zero or more configurations in which the UE assumes zero power for the CSI-RS may be used.

A CSI-RS configuration may be signaled by a higher layer. For example, a CSI0RS configuration may be signaled by a CSI-RS_Config IE (information element) transmitted through a higher layer. Table 1 shows an example of a CSI-RS-Config IE.

TABLE 1

```
-- ASN1START
CSI-RS-Config-r10 ::-     SEQUENCE {
      csi-RS-r10                  CHOICE {
            release                     NULL,
            setup                       SEQUENCE {
                  antennaPortsCount-r10             ENUMERATED {an1, an2, an4, an8},
                  resourceConfig-r10                INTEGER (0..31),
                  subframeConfig-r10                INTEGER (0..154),
                  p-C-r10                           INTEGER (-8..15)
            }
      }                                       OPTIONAL,              -- Need ON
      zeroTxPowerCSI-RS-r10       CHOICE {
            release                     NULL,
            setup                       SEQUENCE {
                  zeroTxPowerResourceConfigList-r10       BIT STRING (SIZE (16)).
                  zeroTxPowerSubframeConfig-r10           INTEGER (0..154)
            }
      }                                       OPTIONAL               -- Need ON
}
-- ASN1STOP
```

Referring to Table 1, the 'antennaPortsCount' field indicates the number of antennas used for CSI-RS transmission. The 'resourceConfig' field indicates a CSI-RS configuration. The 'SubframeConfig' field and the 'zeroTxPowerSubframeConfig' field indicate the configuration of a subframe in which a CSI-RS is transmitted.

The 'zeroTxPowerSubframeConfig' field indicates the configuration of a zero-power CSI-RS. A CSI-RS configuration corresponding to a bit set to 1 in a bitmap of 16 bits of the 'zeroTxPowerSubframeConfig' field may be set to the zero power CSI-RS.

A sequence $r_{l,n_s}(m)$ for the CSI-RS is generated by the following Equation:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, \ldots, N_{RB}^{max,DL} - 1$$

where, $$c_{init} =$$

$$2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

where $n_s$ is a slot number in a radio frame, and l denotes an OFDM symbol number in a slot. c(i) denotes a pseudo random sequence, and starts with $c_{init}$ in each OFDM symbol. $N_{ID}^{cell}$ denotes a physical layer cell ID.

In subframes configured to transmit the CSI-RS, the RS sequence $r_{l,n_s}(m)$ is mapped to a complex-valued modulation symbol $a_{k,l}^{(p)}$ used as a reference symbol for the antenna port p.

The relationship between $r_{l,n_s}(m)$ and $a_{k,l}^{(p)}$ is as shown in the following Equation:

$$a_{k,l}^{(p)} = w_{l''} \cdot r(m) \quad \text{[Equation 2]}$$

where, $$k = k' + 12m +$$

-continued $$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

where (k', l') and $n_s$ are given in Table 2 and Table 3 below. The CSI-RS can be transmitted in a downlink slot satisfying the conditions ($n_s$ mod 2) of Table 2 and Table 3 below (herein, 'mod' denotes a modular operation, that is, ($n_s$ mod 2) denotes a remainder obtained by dividing ns by 2).

Table 2 shows a CSI-RS configuration in case of a normal CP, and Table 3 shows a CSI-RS configuration in case of an extended CP.

TABLE 2

| | CSI-RS configuration index | Number of CSI-RS configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD frame and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI-RS configuration index | Number of CSI-RS configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD frame and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE can transmit the CSI-RS in a downlink slot satisfying the conditions of $n_s$ mod 2 in Tables 2 and 3. The UE does not transmit the CSI-RS in the following cases: a special subframe of a TDD frame; a subframe in which a CSI-RS transmission collides with a synchronization signal, a PBCH (physical broadcast channel), and a system information block type 1 (SystemINformationBLockType1); and a subframe in which a paging message is transmitted.

In addition, a resource element used to transmit an CSI-RS for any one antenna port is not used to transmit a PDSCH or a CSI-RS for any other antenna ports included in the set S in which S={15, 16}, S={17, 18}, S={19, 20}, or S={21, 22}.

Table 4 shows an example of a subframe configuration for a CSI-RS transmission.

TABLE 4

| CSI-RS-SubframeConfig $I_{CSI-RS}$ | CSI-RS period $T_{CSI-RS}$ (subframe) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 4, the period $T_{CSI-RS}$ and offset $\Delta_{CSI-RS}$ of a subframe for a CSI-RS configuration may be determined depending on a CSI-RS subframe configuration $I_{CSI-RS}$. The CSI-RS subframe configuration of Table 4 may be either the SubframeConfig' field or 'ZeroTxPowerSubframeConfig' field of the CSI-RS-Config IE of Table 1. The CSI-RS subframe configuration may be separate for a non-zero power CSI-RS and a zero-power CSI-RS. A subframe for a CSI-RS transmission needs to satisfy Equation 3:

$$(10n_f + \lfloor n_s/2 \rfloor - \Delta_{CSI-RS}) \bmod T_{CSI-RS} = 0 \quad \text{[Equation 3]}$$

FIG. 7 shows an example of an RB to which a CSI-RS is mapped.

FIG. 7 shows resource elements used for a CSI-RS in a normal CP structure when the CSI-RS configuration index is 0. Rp denotes a resource element used to transmit a CSI-RS on an antenna port p. Referring to FIG. 7, CSI-RSs for antenna ports 15 and 16 are transmitted through a resource element corresponding to the third subcarrier (subcarrier index 2) of the sixth and seventh OFDM symbols (OFDM symbol indexes 5 and 6) of the first slot. CSI-RSs for antenna ports 17 and 18 are transmitted through a resource element corresponding to the ninth subcarrier (subcarrier index 8) of the sixth and seventh OFDM symbols (OFDM symbol indexes 5 and 6) of the first slot. CSI-RSs for antenna ports 19 and 20 are transmitted through the same resource element through which the CSI-RSs for the antenna ports 15 and 16 are transmitted, and CSI-RSs for antenna ports 21 and 22 are transmitted through the same resource element through which the CSI-RSs for the antenna ports 17 and 18 are transmitted.

If CSI-RSs are transmitted to the UE through 8 antenna ports, the UE shall receive RBs to which R15 to R22 are mapped. That is, the UE will receive CSI-RSs having a specific pattern.

FIG. 8 shows the concept of CSI feedback.

Referring to FIG. 8, when a transmitter transmits a reference signal, e.g., a CSI-RS, a receiver measures the CSI-RS, generates a CSI, and provides CSI feedback to the transmitter. The CSI includes a PMI, an RI, a CQI, and the like.

The RI is determined on the basis of the number of allocated transmission layers and may be acquired from related downlink control information (DCI). The PMI may be fed back in case of a closed-loop spatial multiplexing (SM) and large delay CDD transmission. The receiver calculates a post-processing SINR for each of ranks 1 to 4, converts the calculated SINR to a sum capacity, and is then able to select a best PMI from the codebook based on the sum capacity. Also, a best RI is determined on the basis of the sum capacity. CQI denotes channel quality, and may given an index of 4 bits as show in the following Table. The UE may provide feedback with the indexes of the following Table.

TABLE 5

| CQI index | modulation | coding rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The present invention will now be described.

In the multi-node system, the base station may request each UE to measure CSI (channel state information) about neighboring nodes and provide feedback with this information. The request may be made on the basis of a UE-specific CSI-RS pattern. Hereinbelow, the CSI-RS pattern denotes a non-zero power CSI-RS pattern.

The CSI-RS pattern denotes a pattern in which the CSI-RS is mapped to a RB, and it may denote a reference signal pattern defined by a CSI-RS configuration index and a CSI-RS subframe configuration index. The UE measures CSI about configured CSI-RS patterns and provides CSI feedback. A CSI-RS pattern in an RB may be transmitted from one node or from a plurality of nodes.

FIG. 9 shows an example in which multiple CSI-RS patterns are configured.

Referring to FIG. 9, the base station may be configured such that PRH1 transmits a CSI-RS pattern according to CSI-RS configuration B through antenna ports 15 and 16, and PRH2 transmits a CSI-RS pattern according to CSI-RS configuration A through antenna ports 15 and 16. That is, the base station may be configured such that each node uses a different CSI-RS pattern.

FIG. 10 shows an example in which a single CSI-RS pattern is configured for multiple nodes.

Referring to FIG. 10, PRH1 transmits a CSI-RS pattern according to CSI-RS configuration A through antenna ports 17 and 18, and PRH2 transmits a CSI-RS pattern according to CSI-RS configuration B through antenna ports 15 and 16. That is, a single CSI-RS pattern may consist of CSI-RSs transmitted from multiple nodes. The base station (macropoint) may inform the UE that CSI-RS configuration A will be transmitted on four antenna ports. In this case, even if the same CSI-RS pattern is used, the base station may inform the UE about whether a single no transmits CSI-RSs through four antennas or two nodes transmit CSI-RSs through two antenna ports.

The CSI-RS pattern may be used for various purposes/usages. The purposes/usages will be described below.

In the multi-node system, the UE may be connected to different nodes for uplink and downlink. That is, the UE is able to receive a signal from node 1 in downlink and transmit a signal to node 2 in uplink. A node connected in downlink may be referred to as a transmission node (transmission point; TP), and a node connected in uplink may be referred to as a reception node (reception point; RP). In this case, a CSI-Rs pattern for downlink measurement and a CSI-RS pattern for uplink measurement may be configured independently.

Alternatively, CSI-RS patterns for path loss (PS) measurement and CSI-RS patterns for CSI measurement may be configured separately for the UE.

Alternatively, CSI-RS patterns to be regarded as interference may be reported upon CSI measurement.

The base station may add usage information to CSI-RS configuration information to inform the UE of the above-mentioned purposes/usages.

The UE may receive the CSI-RS configuration information from the base station, and know for what purposes/usages the configured CSI-Rs patterns are used, based on the usage information. The UE performs an operation for a given CSI-RS pattern based on the usage information.

For example, if a first CSI-RS pattern is used to perform channel measurement to generate CSI, the UE performs channel measurement using the first CSI-Rs pattern, generates CSI, and provides CSI feedback to the base station.

If a second CSI-RS pattern is used to measure path loss measurement, the UE measures path loss using the second CSI-Rs pattern, and then performs uplink power control on an uplink signal to be transmitted to the reception node.

The following Table 6 schematically shows the conventional CSI-RS-Config IEs of Table 1 for convenience of description.

TABLE 6

```
CSI-RS-Config IE
{
        csi-RS // (OPTIONAL)
        {
                Antenna port                    : select one from 1, 2, 4, and 8,
                resource configuration          : select one from integers 0~31,
                subframe configuration          : select one from integers 0~154,
                Power control                   : select one from integers -8 ~ 15
        }
        zeroTxPowerCSI-RS //(OPTIONAL)
        {
                zeroTxPowerResourceConfigList   : bitmap of 16 bits,
                zeroTxPowerSubframeConfig              : select one from integers 0~154
        }
}
```

In the tables described below, the configuration of a zero power CSI-RS of Table 6 will be omitted.

One of the following methods can be employed to specify the usages of non-zero power CSI-RS patterns.

Method 1 is a method for specifying a plurality of CSI-RS-Config IEs and signaling the usage of each CSI-RS-Config IE. That is, this method is a method for indicating the usages of CSI-RSs configured by the CSI-RS-Config IEs through separate signaling, rather than through the CSI-RS-Config IEs.

Method 2 is to use CSI-RS-Config IEs differently according to usage. A field or bit indicating the usage of each CSI-RS-Config IE may be added to each CSI-RS-Config IE. CSI-RS patterns for the same usage may be simultaneously configured by a single CSI-RS-Config IE. In this case, the existing format may be modified into a format for indicating multiple CSI-RS patterns. The following Table 7 is an example of specifying multiple CSI-RS patterns by 'for' sentence:

TABLE 7

```
CSI-RS-Config IE
{
        for (multiple csi-RS pattern allocation) {
                csi-RS // (OPTIONAL)
                {
                        Antenna port              : select one from 1, 2, 4, and 8,
                        subframe configuration    : select one from integers 0~154,
                        Power control             : select one from integers -8 ~ 15
                }
        }
}
```

The following Table 8 is an example of specifying multiple CSI-RS patterns by representing the 'resource configuration' field in a bitmap.

TABLE 8

CSI-RS-Config IE
{
    csi-RS // (OPTIONAL)
    {
        Antenna port                     : select one from 1, 2, 4, and 8,
           resource configuration : represent 0~31 in a bitmap and select several from 0~31,
              subframe configuration : select one from integers 0~154,
              Power control                 : select one from integers −8 ~ 15
    }
}

Method 3 is to transmit a single CSI-RS-Config IE to a single UE. CSI-RS patterns used for different usages can be defined within a single CSI-RS-Config IE.

The CSI-RS patterns for different usages may be represented in a bitmap as shown in the following table.

TABLE 9

CSI-RS-Config IE
{
    Usage1-csi-RS // (OPTIONAL)
    {
        Antenna port              : select one from 1, 2, 4, and 8,
        resource configuration   : represent 0~31 in a bitmap and select several from 0~31,
        subframe configuration  : select one from integers 0~154,
        Power control             : select one from integers −8 ~ 15
    }
    Usage2-csi-RS // (OPTIONAL)
    {
        Antenna port              : select one from 1, 2, 4,and 8,
        resource configuration   : represent 0~31 in a bitmap and select several from 0~31,
        subframe configuration  : select one from integers 0~154,
        Power control             : select one from integers −8 ~ 15
    }
    ...
}

For example, in Table 9, a plurality of 'Usage1-csi-RSs' may be defined by bits having a value 1 in a bitmap of the 'resource configuration' field. These RSs are used for usage 1.

The following Table 10 is another implementation example of the CSI-RS-Config IE that specifies CSI-RS patterns for different usages. Table 10 is different from Table 9 in that CSI-RS patterns are indicated directly in a 'for' sentence, rather than a bitmap.

TABLE 10

CSI-RS-Config IE
{
    for (multiple csi-RS pattern allocation for Usage1) {// (OPTIONAL)
        csi-RS
        {
            Antenna port              : select one from 1, 2, 4, and 8,
            resource configuration  : select one from integers 0~31,
            subframe configuration  : select one from integers 0~154,
            Power control              : select one from integers −8 ~ 15
        }
    }
    for (multiple csi-RS pattern allocation for Usage2) {// (OPTIONAL)
        csi-RS
        {
            Antenna port              : select one from 1, 2, 4, and 8,
            resource configuration  : select one from integers 0~31,
            subframe configuration  : select one from integers 0~154, TABLE 10-continued

```
            Power control       : select one from integers −8 ~
                                  15
         }
      }
      ...
}
```

In the above tables, the indications of zero power CSI-Rs patterns are omitted for convenience of description. Zero power CSI-RS patterns may be included in the same CSI-RS-Config IE as non-zero power CSI-RS patterns for the same usage. Alternatively, both non-zero power CSI-RS patterns and zero power CSI-RS patterns for different usages may be included in a single CSI-RS-Config IE.

As described in detail above, CSI-RS patterns and zero power CSI-RS patterns for various usages may be configured for the UE. The usages will be exemplified below in detail.

Usage 1: It is to report a CSI-RS-based RRM (radio resource management) result to the base station. Such measurement can be performed for the purposes of cell/point/node reselection and handover by the UE, and is used not for the purpose of transmission configuration, but for the purpose of deciding whether to perform cell/point/node reselection, handover, etc. Examples of the RPM measurement result include reference signal received power (RSRP), reference signal received quality (RSRQ), and received strength signal indicator (RSSI). The RSRP refers to the average received power over the resource elements that carry cell-specific reference signals within certain frequency bandwidth. The RSPQ indicates reference signal received quality, and the RSRP is a kind of RSRQ. The RSSI measures the average total received power observed in OFDM symbols containing reference signal symbols for antenna port 0 in the measurement bandwidth over N resource blocks.

In the multi-node system, each node may use the same cell ID. In this case, the UE cannot identify each node within the cell by CRS. Therefore, the conventional RRM (radio resource management) method defined on the basis of CRS makes it possible to define which cell the UE shall be connected to; however, it is difficult to define which node the UE shall be connected by using this method. To compensate this problem, there is a need to define a CSI-RS-based RPM method. To this end, it is necessary to define CSI-RS-based RRM measurement, and it is necessary for the UE to provide measurement result feedback to the base station.

Usage 2: It is for the UE to measure channel state information and report it to the base station. This measurement is performed for the purpose of transmission configuration. For example, the base station can determine an MCS (modulation and coding scheme) based on the channel state information.

Usage 3: It is for uplink power control. The UE may measure path loss using a CSI-RS pattern transmitted from the reception node, and then perform uplink power control. That is, the UE performs path loss measurement only on a CSI-RS pattern configured to be used for uplink transmission power control, among the CSI-RS patterns, and uses the measurement result for power control during uplink signal transmission.

Usage 4: It is to detect whether a CSI-RS pattern is interference or not and measure CSI.

The UE may perform interference measurement only on CSI-RS patterns configured to be used for interference measurement, among non-zero CSI-RS patterns.

The operation of the UE for Usage 3 can be further divided. For example, CSI-RS patterns for different nodes can be used according to uplink signal/channel.

For example, power control for SRS transmission involves measuring path loss using a CSI-RS pattern for the transmission node, and power control for PUCCH/PUSCH transmission involves measuring path loss using a CSI-RS pattern for the reception node.

SRSs can be divided according to various usages, and a CSI-RS pattern to be used for path loss measurement and power control can be determined according to the usages of the SRSs. For example, provided that the SRSs are divided into the first type and the second type, path loss estimated using the CSI-RS pattern for the transmission node can be used for power control of the SRSs of the first type, and path loss estimated using the CSI-RS pattern for the reception node can be used for power control of the SRS of the second type.

The above-described Usages 1 and 2 define a report about CSI-RS-based measurement of the UE. Also, the CSI-RS patterns for Usage 1 may include all the CSI-RS patterns for Usages 2 to 4.

The base station configures CSI-RS patterns for Usage 1 for the UE. If there is any CSI-RS pattern used for any other usages (i.e., one or more of Usages 2 to 4), among the CSI-RS patterns, those usages are indicated.

That is, the base station configures a plurality of CSI-RS patterns used for Usage 1 for the UE, and indicates a CSI-RS pattern requiring CSI feedback, a CSI-RS pattern to be used for uplink power control, and a CSI-RS pattern to be used for interference measurement, among the plurality of CSI-RS patterns.

FIG. 11 shows a method for a UE to provide reference signal feedback according to an embodiment of the present invention.

The UE receives CSI-RS configuration information containing usage information from the base station (S200).

The UE performs a first measurement on CSI-RS patterns configured based on the CSI-RS configuration information (S210). The first measurement may be a measurement the UE performs by default, for example, a RRM-related measurement (RSRP, RSRQ, RSSI, et.) based on CSI-RS. This measurement is necessary for radio resource management.

The UE performs a second measurement only on CSI-RS patterns corresponding to the usage information, among the CSI-RS patterns configured based on the CSI-RS configuration information (S220). The second measurement is for the usage indicated by the usage information, for example, any one of the above-described Usages 2 to 4.

The following table shows an example of CSI-RS configuration information the base station transmits to the UE.

TABLE 11

```
CSI-RS-Config IE
{
        for (multiple csi-RS pattern allocation) {
                csi-RS // (OPTIONAL)
                {
                        Antenna port                    : select one from 1, 2, 4, and 8,
                        resource configuration          : select one from integers 0~31,
                        subframe configuration          : select one from integers 0~154,
                        Power control                   : select one from integers -8 ~ 15
                        CSI feedback triggering : 1 bit(ON/OFF)
                        Pathloss calculation for UL PC: 1 bit (ON/OFF)
                        Interference: 1 bit (ON/OFF)
                }
        }
        ...
}
```

As shown in Table 11, usage information about one or two or more of a plurality of CSI-RS patterns configured in a 'for' sentence may be contained. In this case, the UE performs a second measurement only on given CSI-RS patterns.

The usage information may indicate any one of a plurality of usages by 1 bit in an on/off manner. In Table 11, the UE shall performs CSI feedback, as second measurement feedback, on a CSI-RS pattern in which 'CSI feedback triggering' is turned ON. Alternatively, in Table 11, the UE shall perform path loss measurement on a CSI-RS pattern in which 'Pathloss calculation for UL PC' is turned ON, based on the second measurement feedback, and uses the path loss measurement result for uplink transmission power control. Also, in Table 11, a CSI-RS pattern in which 'Interference' is turned ON may be regarded as interference, and CSI measurement may be performed.

Using the above-described method, the UE can transmit, to the base station, feedback information about additional usage for a specific CSI-RS pattern among the plurality of configured CSI-RS patterns. Therefore, the volume of feedback information can be reduced. Moreover, the system performance is improved because required information feedback is provided to the base station. Since the base station is able to indicate the usage of each CSI-RS pattern by adding small bits while configuring a plurality of CSI-RS patterns for the UE, signaling overhead can be reduced.

FIG. 12 is a block diagram of a wireless communication system according to an embodiment of the present invention.

A base station 800 includes a processor 820, a memory 820, and an RF (radio frequency) unit 830. The processor 810 implements the proposed functions, processes and/or methods. For example, the processor 810 transmits to a UE CSI-RS configuration information containing usage information, and receives channel information feedback from the UE. Transmission method determination or radio resource management may be performed based on the received channel information feedback. The layers of a radio interface protocol may be implemented by the processor 810. The memory 820, connected to the processor 810, stores various pieces of information for driving the processor 810. The RF unit 830, connected to the processor 810, transmits and/or receives a radio signal.

The UE 900 includes a processor 910, a memory 920, and an RF (radio frequency) unit 930. The processor 910 implements the proposed functions, processes and/or methods. For example, the processor 910 receives CSI-RS configuration information containing usage information, performs a default first measurement and an optional second measurement to generate channel information, and then provides channel information feedback to the base station. The layers of a radio interface protocol may be implemented by the processor 910. The memory 920, connected to the processor 910, stores various pieces of information for driving the processor 910. The RF unit 930, connected to the processor 910, transmits and/or receives a radio signal.

The processors 810 and 910 may include an ASIC (application-specific integrated circuit), a different chip-set, a logical circuit and/or a data processing device. The memories 820 and 920 may include ROM (read-only memory), RAM (random access memory), a flash memory, a memory card, a storage medium and/or a different storage device. The RF units 830 and 930 may include a baseband circuit for processing a radio signal. When an embodiment is implemented by software, the foregoing schemes may be implemented by modules (processes, functions, etc.) for performing the foregoing functions. The memories 820 and 920 may exist within or outside of the processors 610 and 710 and may be connected to the processors 810 and 910 through various well-known means.

The invention claimed is:

1. A method for a user equipment (UE) to measure channel information and provide channel information feedback in a wireless communication system, the method comprising:
   receiving, from a base station, channel state information reference signal (CSI-RS) configuration information for configuring non-zero power CSI-RS patterns,
   wherein the CSI-RS configuration information includes usage information for some of the non-zero power CSI-RS patterns,
   wherein the usage information includes a bitmap and each bit of the bitmap corresponds to each usage of a plurality of usages,
   wherein the plurality of usages includes a measurement for channel state information generation, a measurement for uplink transmission power control and an interference measurement, and
   wherein the usage information indicates one usage among the plurality of usages for each of the some of the non-zero power CSI-RS patterns;
   performing a first measurement for radio resource management on all of the non-zero power CSI-RS patterns configured based on the CSI-RS configuration information; and
   performing a second measurement only on non-zero power CSI-RS patterns corresponding to the usage information, the second measurement being determined based on the usage information.

2. The method of claim 1, wherein the first measurement is performed for the purpose of cell reselection, node reselection or handover by the UE.

3. The method of claim 2, wherein the first measurement is performed to measure any one of reference signal received power (RSRP), reference signal received quality (RSRQ), and received strength signal indicator (RSSI).

4. The method of claim 1, wherein the CSI-RS patterns used for the second measurement are part of the CSI-RS patterns used for the first measurement.

5. The method of claim 1, wherein results of the first and second measurements are transmitted to the base station.

6. A user equipment (UE) for measuring channel information and providing channel information feedback in a wireless communication system, the UE comprising:
   a radio frequency (RF) unit configured to transmit or receive a radio signal; and
   a processor connected to the RF unit,
   wherein the processor is configured to:
      receive, from a base station, channel state information reference signal (CSI-RS) configuration information for configuring non-zero power CSI-RS patterns,
      wherein the CSI-RS configuration information includes usage information for some of the non-zero power CSI-RS patterns,
      wherein the usage information includes a bitmap and each bit of the bitmap corresponds to each usage of a plurality of usages,
      wherein the plurality of usages includes a measurement for channel state information generation, a measurement for uplink transmission power control and an interference measurement, and
      wherein the usage information indicates one usage among the plurality of usages for each of the some of the non-zero power CSI-RS patterns,
      perform a first measurement for radio resource management on all of the non-zero power CSI-RS patterns configured based on the CSI-RS configuration information, and
      perform a second measurement only on non-zero power CSI-RS patterns corresponding to the usage information, the second measurement being determined based on the usage information.

7. The UE of claim 6, wherein the first measurement is performed for the purpose of cell reselection, node reselection or handover by the UE.

8. The UE of claim 7, wherein the first measurement is performed to measure any one of reference signal received power (RSRP), reference signal received quality (RSRQ), and received strength signal indicator (RSSI).

9. The UE of claim 6, wherein the CSI-RS patterns used for the second measurement are part of the CSI-RS patterns used for the first measurement.

10. The UE of claim 6, wherein the processor transmits results of the first and second measurements to the base station.

* * * * *